United States Patent [19]
Rinkler et al.

[11] 3,720,733
[45] March 13, 1973

[54] POLYACRYLONITRILE POLYMER MIXTURES WITH AN AFFINITY FOR ACID DYES CONTAINING A CYCLIC IMIDE POLYMER

[75] Inventors: Heinrich Rinkler; Horst Wieden, both of Dormagen; Helmut Engelhard, Leverkusen; Alfred Nogaj, Dormagen, all of Germany

[73] Assignee: Farbenfabriken Bayer Aktiengesellschaft, Leverkusen, Germany

[22] Filed: April 21, 1970

[21] Appl. No.: 30,590

[30] Foreign Application Priority Data

April 26, 1969 Germany................P 19 21 362.8

[52] U.S. Cl. .............260/895, 161/177, 260/78, 260/78.5 T, 260/79.3 M, 260/85.5 R, 260/85.5 ES, 260/85.5 AM, 260/85.5 XA, 260/85.5 HC, 260/898
[51] Int. Cl. .............................................C08f 31/04

[58] Field of Search.....260/898, 78.5 T, 895; 264/78

[56] References Cited

UNITED STATES PATENTS

| 3,584,077 | 6/1971  | Mizutani......................260/873 |
| 2,527,863 | 10/1950 | Webb..............................18/47.5 |
| 3,530,201 | 9/1970  | Schwarcz......................260/857 |
| 3,310,456 | 3/1967  | Fujita et al. ..................161/177 |
| 2,790,783 | 4/1957  | Coover..........................260/30.2 |

Primary Examiner—Murray Tillman
Assistant Examiner—John Seibert
Attorney—Plumley and Tyner

[57] ABSTRACT

Polymer mixtures with high affinity for acid dyes consisting essentially of at least 60 percent by weight of an acrylonitrile polymer and at most 40 percent by weight of a cyclic imide copolymer, the imide nitrogen being substituted by an aliphatic or aromatic radical containing another tertiary or quaternary nitrogen atom.

18 Claims, No Drawings

POLYACRYLONITRILE POLYMER MIXTURES WITH AN AFFINITY FOR ACID DYES CONTAINING A CYCLIC IMIDE POLYMER

This invention relates to a polymer mixture comprising an acrylonitrile homopolymer or copolymer and a cyclic imide copolymer. It is possible by spinning these mixtures to obtain filaments with high affinity for acid dyes.

It is known that filaments and yarns produced from acrylonitrile homopolymers and copolymers of acrylonitrile with neutral comonomers usually have an affinity for dyes that is inadequate for practical purposes. Thus, for example, if it is desired to obtain acrylic polymers with an affinity for basic dyes, these polymers can readily be obtained by copolymerising acrylonitrile with unsaturated sulphonic acids, for example vinyl sulphonic acid, allyl sulphonic acid, methallyl sulphonic acid or styrene sulphonic acid.

Acrylonitrile polymers with an affinity for acid dyes can be obtained by copolymerising acrylonitrile and unsaturated amines, for example N-(3-dimethylaminopropyl)-acrylamide; vinyl, allyl or methallyl ethers of aminoalcohols, for example ($\beta$-diethylaminoethyl)-vinyl ether, ($\beta$-morpholino-ethyl)-vinyl ether and methallyl-N,N-dimethylaminoethyl ether; or vinyl pyridine and its derivatives, for example 2- and 4-vinylpyridine, 2-methyl-5-vinylpyridine or 2-vinyl-5-ethyl-pyridine. Unlike the sulphonic acids referred to above, unsaturated amines cannot be copolymerised with acrylonitrile quite so readily. In addition to the required affinity for acid dyes, the basic copolymers have a relatively high affinity for basic dyes. This affinity for basic dyes is undesirable and has an adverse effect in the production of two-color dye finishes in dyeing baths containing basic and acid dyes. In addition, basic copolymers undergo fairly serious discoloration, either in solution or in solid form, so that distinct differences in natural color in relation to acrylonitrile polymers or copolymers with acid or neutral comonomers occur as early as during preparation.

It is an object of this invention to provide polymer mixtures with an acrylonitrile polymer or acrylonitrile copolymer component of at least 60 percent which show a particularly high affinity for acid dyes and a high reservation towards basic dyes and which show a very limited tendency towards yellowing. This object is accomplished by a polymer mixture with an high affinity for acid dyes consisting essentially of at least 60 percent by weight of an acrylonitrile polymer (A) which comprises an acrylonitrile polymer selected from the group consisting of polyacrylonitrile and acrylonitrile copolymer containing at least 50 percent by weight of acrylonitrile and at the most 50 percent by weight of other copolymerisable monomers, and at the most 40 percent by weight of a second copolymer (B) of a vinyl monomer and a cyclic imide substituted on the imide nitrogen by an organic radical selected from the group consisting of an aliphatic radical and an aromatic radical, said organic radical containing another tertiary or quaternary nitrogen atom. These polymer mixtures may be converted into filaments or films from solutions.

The cyclic imide copolymers used in the polymer mixtures contain the recurring structural element:

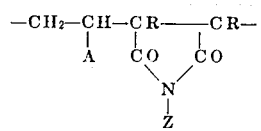

in which
A represents a hydrogen or halogen atom or an alkyl, aryl, alkoxy, or alkyl ester group;
Z represents an

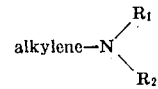

group in (which $R_1$ and $R_2$, which may be the same or different, each represents a lower alkyl radical or $R_1$ and $R_2$ together with the nitrogen atom to which they are attached form a heterocyclic radical), or a 5-membered or 6-membered heterocyclic ring which contains at least one nitrogen atom in the ring system and which is attached either directly or through an alkylene or arylene group to the nitrogen atom of the imide ring and an alkylene-$N^{\oplus}(R_3)$ $X^{\ominus}$- group, or a 5- or 6-membered quaternised heterocyclic ring containing at least one nitrogen atom in the ring system which is quaternised and has an $X^{\ominus}$ anion and is attached either directly or through an alkylene or arylene group to the nitrogen atom of the imide ring;
each R represents a lower alkyl radical; and
$X^{\ominus}$ represents an anion, for example $CH_3SO_4^{\ominus}$,

or halogen$^{\ominus}$.

The basic cyclic imide copolymers are obtained in known manner by copolymerising unsaturated acid anhydrides, such as maleic acid anhydride, and monomers, for example styrene, vinyl alkyl esters or vinyl alkyl ethers, and subsequently reacting the anhydride groups of the resulting copolymers with amines containing at least one other basic center in addition to a primary amino group, the imide ring being formed in, for example, dimethyl formamide, dioxanacetic acid anhydride, isopropanol or amyl alcohol. (Journal Org. Chem. 24, 1404 (1959); Journ. Polymer Science, part C, 24, 101–112 (1968)). Primary amines suitable for use in this process include, for example, 3-dimethyl amino-1-propylamine; N-3-aminopropyl-morpholine; N-2-aminoethylpiperidine; 4-aminopyridine; 4-aminomethylpyridine; 4-aminopyrimidine; and 4-aminotriazine.

The basic tertiary nitrogen atom may optionally be subsequently quaternised with a quaternising agent, for example dimethyl sulphate, p-toluene suphonic acid methyl ester or methyl iodide. This is accomplished by dissolving the cyclic imide copolymers in acetone or leaving them in solution as obtained by their preparation and adding a quaternising agent, e.g., dimethylsulfate. The quaternised products then precipitate and can be isolated. Depending on the used solvent in special cases the quaternised product is left in solution (for example in PMF) which is mixed with the polyacrylonitrile solution.

The acrylic polymers are obtained in known manner by polymerising acrylonitrile in aqueous medium with radical-forming catalyst or catalyst systems, for example persulphatebisulphite, peroxides, hydroperoxides or perborates. Polymerization of the acrylonitrile may also be carried out in the presence of other copolymerisable unsaturated compounds. Such compounds include, inter alia, acrylic and methacrylic acid esters; vinyl esters such as vinyl acetate; styrene and its neutral derivatives; vinyl chloride; vinylidene chloride; vinylidene cyanide; unsaturated acids or their salts, for example allyl sulphonic acid, methallyl sulphonic acid, styrene sulphonic acid, acrylic acid or methacrylic acid; or disulphonimides, for example 3-(methacryloylamino)-diphenyl disulphonimide.

The ratio in which the acrylonitrile homopolymer or copolymer and the cyclic imide copolymer are mixed is governed by the purpose for which the end products are to be used. For the production of fibers with an affinity for acid dyes, polymer mixtures of from 98 to 60 parts by weight, and preferably from 90 to 75 parts by weight, of acrylonitrile homopolymer or copolymer, and from 2 to 40 parts by weight, and preferably from 10 to 25 parts by weight, of cyclic imide copolymer are spun together.

The particular advantage is that it is possible, simply by mixing acrylonitrile homopolymers or acrylonitrile copolymers with neutral or acid comonomers and the cyclic imide copolymers, to obtain polymer mixtures with a surprisingly high affinity for acid dyes. The polymer mixtures according to the invention form clear gel-free solutions in such solvents as dimethyl formamide, dimethyl acetamide or dimethyl sulphoxide, and may readily be dry or wet spun or cast into films from these solutions. The filaments, fibers and films from these solutions have a high degree of whiteness and outstanding thermal stability. They show an excellent affinity for acid dyes coupled with outstanding technological properties. The filaments and fibers show a remarkable reservation towards basic dyes.

The following examples are to further illustrate the invention without limiting it.

EXAMPLE 1

85 parts by weight of an acrylonitrile copolymer with a K-value of 85 (according to Fikentscher Cellulosechemie 13, S. 58 (1932, measured at 80°C) obtained by copolymerising 94 parts by weight of acrylonitrile, 5 parts by weight of methyl acrylate and 1 part by weight of 3-(methacryloylamino)-diphenyl disulphonimide, are dissolved at 80° to 85°C in 223 parts by weight of dimethyl formamide together with 15 parts by weight of a copolymer with the recurring structural unit:

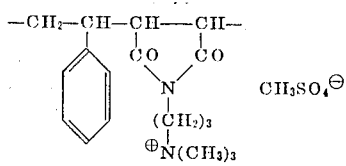

The solution is cast in the form of a thin layer and the film left after removal of the solvent is stretched in hot water in a ratio of 1:2.5.

Filaments can be produced from the solution both by dry and by wet spinning, showing outstanding mechanical properties after stretching in boiling water in a ratio of 1:3.5.

Dyeing the polymer films and filaments with an acid dye, for example Azilandirektblau A (Color index, Vol. I, page 1,264), is carried out by dyeing films approximately 50μ thick and filaments or fibers with a denier of 3.3 dtex for 1 hour at 100°C in a dyeing bath with a composition containing 100 ml of Azilandirektblau A (1 g/liter) and 1 ml of 20 percent by weight sulphuric acid. Quantitative determination of the amount of dye absorbed is carried out by dissolving the dyed films and filaments in dimethyl formamide containing 1 g of sulphuric acid per liter, and pouring the resulting solutions into a quartz bulb 1 cm long. The extinction of the solution at a wavelength of 590 mμ is measured against that of the pure solvent by means of a photometer, for example a Carl Zeiss Elko III. The extinction measured per unit weight of film or fiber is a measure of the quantity of dye absorbed.

For comparison, a copolymer with a composition typical of fibers receptive to acid dyes, comprising 90 percent by weight of acrylonitrile, 5 percent by weight of methyl acrylate and 5 percent by weight of 2-methyl-5-vinylpyridine with a K-value of 83, was cast into a film and spun as in Example 1. The dyeability, adhesion point, strength and reservation towards a basic dye, Astrazonblau B (Color Index 2nd Edition, Vol. III, No. 42 140) are compared in Table I.

TABLE I

| | example 1 | Comparison (Acrylonitrile polymers containing 5% by weight of methyl acrylate and 5% by weight of 2-methyl-5-vinylpyridine) |
|---|---|---|
| film (50 μ): dyeability [g⁻¹](extinction/ g of weighed sample) | 18.5 | 16.2 |
| fiber (3.3 dtex): dyeability [g⁻¹](extinction/ g of weighed portion | 24.6 | 20.6 |
| adhesion point | 225–230°C | 210–215°C |
| strength | 3.5 g/dtex | 2.5 g/dtex |
| reservation to astrazonblau B [g⁻¹] | 1.9 | 4.7 |

EXAMPLE 2

90 Parts by weight of an acrylonitrile homopolymer with a K-value of 90 (according to Fikentscher Cellulosechemie 13, S.58 (1932), measured at 80°C) and 10 parts by weight of a copolymer with the recurring structural unit:

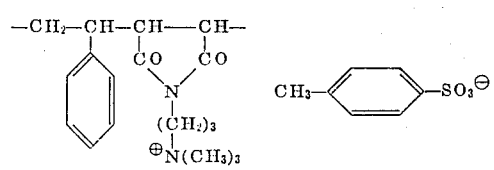

are dissolved together in 370 parts by weight of dimethyl formamide at a temperature of 85°C, and the clear solution which is thus obtained is spun. The filaments obtained are stretched in boiling water in a ratio of 1:5, dried and converted into fibers.

The fibers show outstanding strength (4.0 g/dtex). Their dyeability with Azilandirektblau, as determined in accordance with Example 1, gives an Extinction/g of 22.4 [$g^{-1}$].

EXAMPLE 3

82 Parts by weight of an acrylonitrile copolymer with a K-value of 82 (according to Fikentscher Cellulosechemie 13,S.58 (1932), measured at 80°C) obtained by copolymerising 94 parts by weight of acrylonitrile, 5.5 parts by weight of methyl acrylate and 0.5 part by weight of sodium methallyl sulphonate, are dissolved in 300 parts by weight of dimethyl formamide together with 18 parts by weight of a copolymer with recurring structural unit:

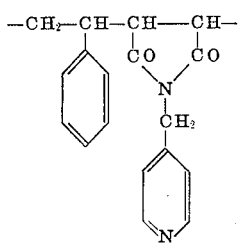

and the resulting solution is spun into filaments.

The filaments stretched in a ratio of 1:3 have a strength of 3.0 g/dtex. Dyeing with Azilandirektblau A gives an Extinction of 20.5 [$g^{-1}$].

What we claim is:

1. A polymer mixture with a high affinity for acid dyes consisting essentially of at least 60 percent by weight of an acrylonitrile polymer (A) which comprises an acrylonitrile polymer selected from the group consisting of polyacrylonitrile and an acrylonitrile copolymer containing at least 50 percent by weight of acrylonitrile and at the most 50 percent by weight of other copolymerisable monomers, and at the most 40 percent by weight of a copolymer (B) of a vinyl monomer and a cyclic imide substituted on the imide nitrogen by an organic radical selected from the group consisting of an aliphatic radical and an aromatic radical, said organic radical containing tertiary or quaternary nitrogen atom.

2. The acrylonitrile polymer mixture as claimed in claim 1 wherein the weight ration of said acrylonitrile polymer (A) to said second copolymer (B) is from 60:40 to 98:2.

3. The acrylonitrile polymer mixture as claimed in claim 1, wherein said acrylonitrile polymer (A) is a copolymer of acrylonitrile and methyl acrylate.

4. The acrylonitrile polymer mixture as claimed in claim 1, wherein said acrylonitrile polymer (A) is a copolymer of acrylonitrile and 3-(methacroylamino)-diphenyl disulphonimide.

5. The acrylonitrile polymer mixture as claimed in claim 1, wherein said acrylonitrile polymer (A) is a copolymer of acrylonitrile and methallyl sulphonic acid.

6. The acrylonitrile polymer mixture as claimed in claim 1, wherein said acrylonitrile polymer (A) is a copolymer of acrylonitrile and an alkali metal salt of methallyl sulphonic acid.

7. Filament with high acid dye affinity of a polymer mixture consisting essentially of at least 60 percent by weight of an acrylonitrile polymer (A) which comprises an acrylonitrile polymer selected from the group consisting of polyacrylonitrile and an acrylonitrile copolymer containing at least 50 percent by weight of acrylonitrile and at most 50 percent by weight of other copolymerizable monomers, and a cyclic imide copolymer (B) consisting essentially of the recurring structural unit

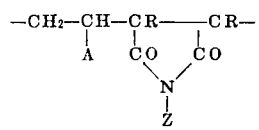

in which

A represents a hydrogen or halogen atom or an alkyl, aryl alkoxy or alkyl ester group, Z represents an

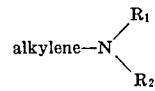

group (in which $R_1$ and $R_2$, which may be the same or different, each represents a lower alkyl radical, or $R_1$ and $R_2$, together with the nitrogen atom, form a heterocyclic radical), or a 5-membered or 6-membered heterocyclic ring which contains at least 1 nitrogen atom in the ring system and which is attached to the nitrogen atom of the imide ring either directly or through an alkylene or arylene group and contains an alkylene-$N^{\oplus}(R)_3X^{\ominus}$ group or a 5- or 6-membered heterocyclic ring which is quaternised and contains an $X^{\ominus}$ anion and is attached to the nitrogen atom of the imide ring either directly or through an alkylene or arylene group, each R represents a lower alkyl radical, and $X^{\ominus}$ represents an anion.

8. Filament with high acid dye affinity consisting essentially of a polymer mixture consisting of at least 60 percent by weight of an acrylonitrile polymer (A) which comprises an acrylonitrile polymer selected from the group consisting of polyacrylonitrile and an acrylonitrile copolymer containing at least 50 percent by weight of acrylonitrile and at most 50 percent by weight of other copolymerizable monomers, and a cyclic imide copolymer (B) consisting essentially of the recurring structural unit

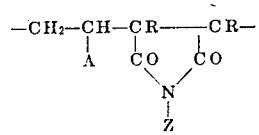

in which

A represents a hydrogen or halogen atom or an alkyl, aryl alkoxy or alkyl ester group, Z represents an

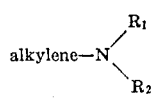

group (in which $R_1$ and $R_2$, which may be the same or different, each represents a lower alkyl radical, or $R_1$ and $R_2$, together with the nitrogen atom, form a heterocyclic radical), or a 5-membered or 6-membered heterocyclic ring which contains at least 1 nitrogen atom in the ring system and which is attached to the nitrogen atom of the imide ring either directly or through an alkylene or arylene group and contains an alkylene-$N^{\oplus}(R)_3 X^{\ominus}$ group or a 5- or 6-membered heterocyclic ring which is quaternised and contains an X anion and is attached to the nitrogen atom of the imide ring either directly or through an alkylene or arylene group, each R represents a lower alkyl radical, and $X^{\ominus}$ represents an anion.

9. The filament of claim 8 in which Z is $-(CH_2)_3 -N(CH_3)_3^{\oplus} X^{\ominus}$.

10. The filament of claim 9 in which $X^{\ominus}$ is $CH_3SO_4^{\ominus}$.

11. The filament of claim 9 in which $X^{\ominus}$ is

12. The filament of claim 8 in which Z is

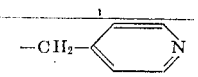

13. The filament of claim 8 in which Z is $-(CH_2)_3 -N(CH_3)_2$.

14. The filament of claim 8 in which Z is

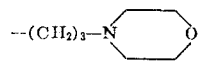

15. The filament of claim 8 in which Z is

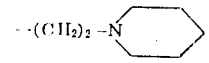

16. The filament of claim 8 in which Z is pyridinyl-4.

17. The filament of claim 8 in which Z is pyrimidinyl-4.

18. The filament of claim 8 in which Z is triazinyl-4.

* * * * *